Jan. 26, 1960    W. L. LAWSON    2,922,348
CAMERA SHUTTER
Filed Feb. 20, 1957    2 Sheets-Sheet 1
FIG. 1
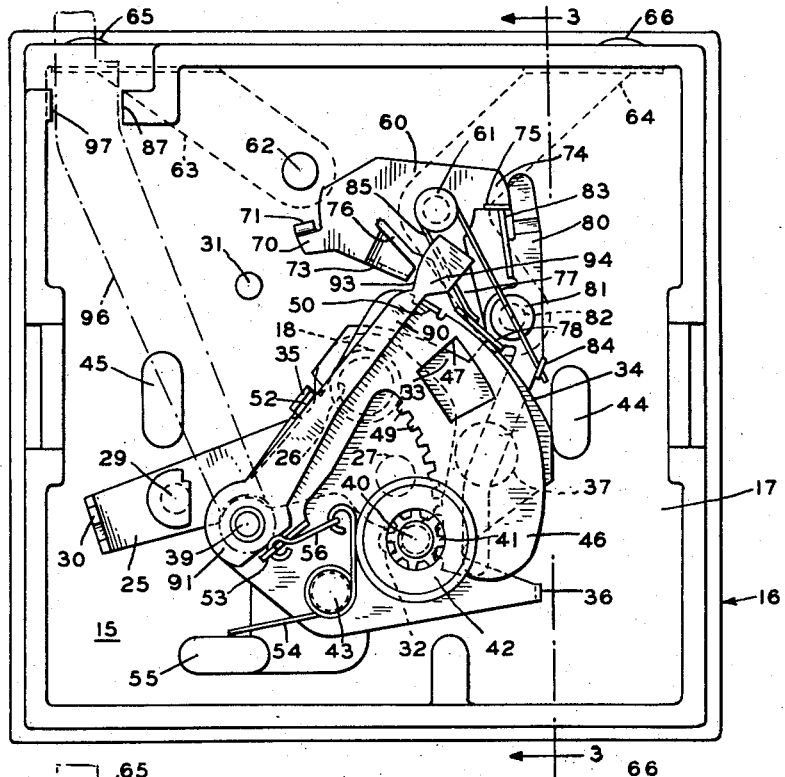
FIG. 2
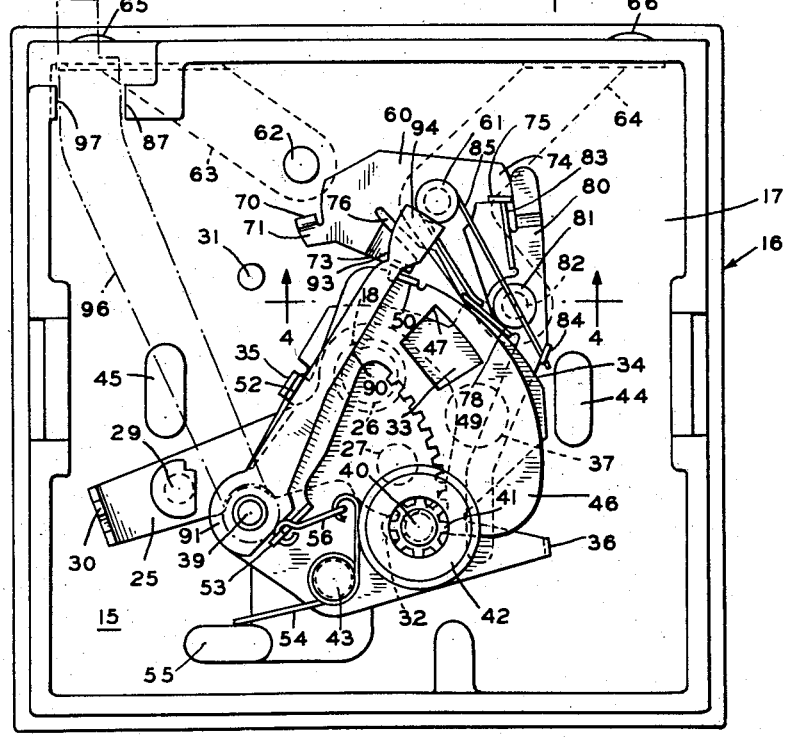

Jan. 26, 1960   W. L. LAWSON   2,922,348
CAMERA SHUTTER
Filed Feb. 20, 1957   2 Sheets-Sheet 2
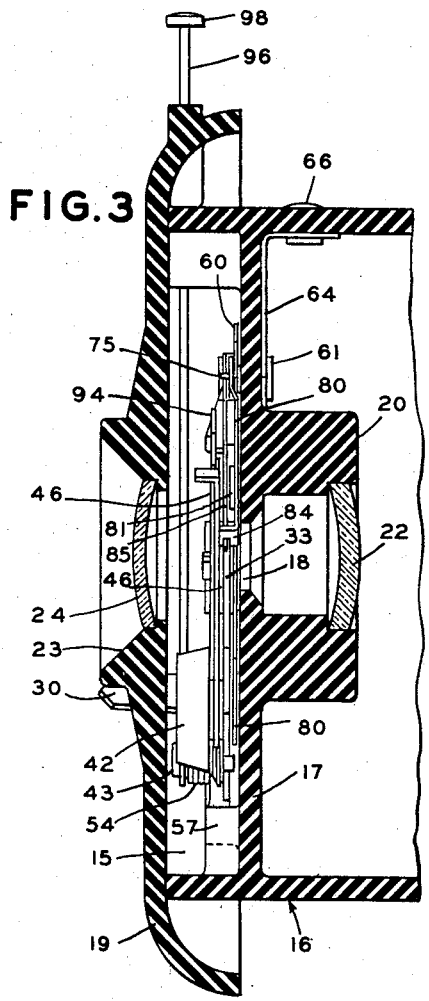
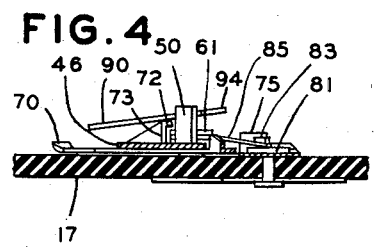
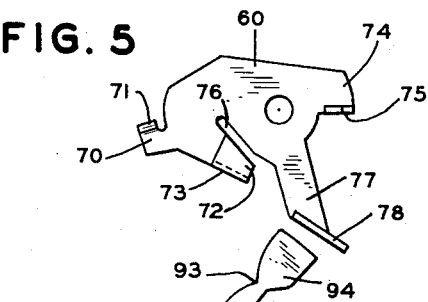
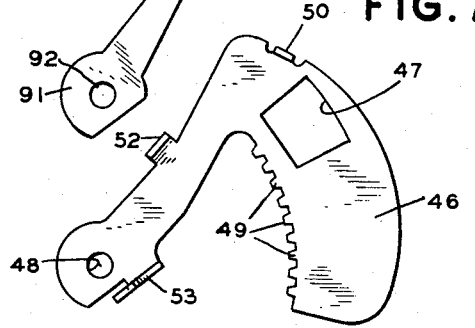
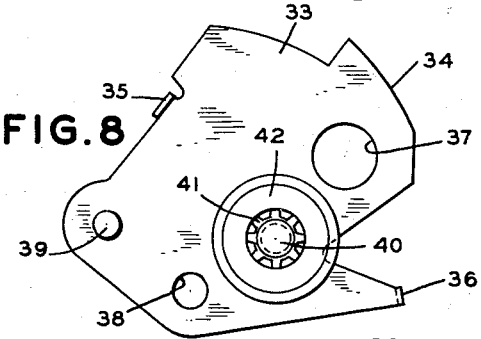
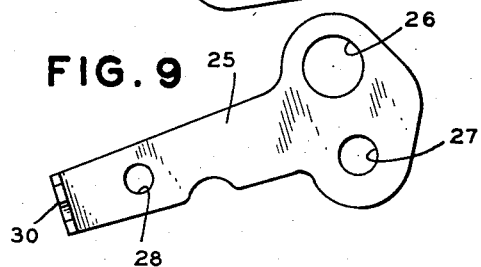

United States Patent Office 2,922,348
Patented Jan. 26, 1960

2,922,348

CAMERA SHUTTER

William L. Lawson, Forest Hills, N.Y., assignor to Whitehouse Products, Inc., Brooklyn, N.Y., a corporation of New York Application February 20, 1957, Serial No. 641,297

2 Claims. (Cl. 95—11.5)

This invention relates to cameras, and more particularly to combined shutter and switch mechanisms for cameras adapted to take pictures with the aid of flash lamps.

In Patent No. 2,690,105 granted to the present applicant and assigned to the assignee of the present application there is disclosed a flash-type camera having a shutter and switch mechanism including a selector blade, an aperture blade and an exposure blade so coordinated and arranged in conjunction with a switch member that the latter completes an electric circuit including a flash lamp upon predetermined movement of the aperture blade at the proper time to coact with operation of the exposure blade.

While the operation of such cameras has proven to be eminently satisfactory, I have found that the trouble-free useful life of the mechanism may be greatly extended.

It is, therefore, a principal object of this invention to provide a camera shutter and switch mechanism that has improved features of construction and operation and that is capable of being manufactured by mass production methods.

Another object is to provide a camera shutter and switch mechanism in which friction and bending of the parts is greatly reduced or minimized.

In accordance with the present invention an important feature resides in the provision of an exposure blade lever which coacts with the switch member for preventing movement of the exposure blade in one direction while the switch member is retained in its open position.

Other objects as well as advantages of the present invention will be apparent from the following description and the accompanying drawings in which Figure 1 is a front elevational view of a camera having its front cover removed and having incorporated therein a shutter and switch mechanism constructed in accordance with the present invention, the parts of the mechanism being in a position of rest before an exposure is made;

Figure 2 is a similar view showing the parts of the mechanism in an intermediate position after an exposure has been made and just before they have returned to the position shown in Figure 1;

Figure 3 is a cross-sectional view taken through line 3—3 of Figure 1 but with the cover plate in position;

Figure 4 is a cross-sectional view along the line 4—4 of Figure 2;

Figures 5–9 are respectively front elevational views of the switch member, exposure blade lever, exposure blade, aperture blade, and selector blade.

Referring first to Figure 3, the shutter and switch mechanism is mounted in a front compartment 15 of a shutter housing 16 which may be made of any desired material such as metal, a suitable synthetic plastic or the like. The housing includes a rear wall 17, having a central exposure opening 18, and a removable cover or face plate 19. Integral with rear wall 17 is a hollow extension 20 that is coaxial with exposure opening 18 and that carries a lens 22. Cover plate 19 has a flared central opening 23 that is aligned with exposure opening 18. A lens 24 is disposed across opening 23.

A selector blade 25, best shown in Figure 9, has a pair of spaced openings 26 and 27, the centers of which are equidistant from the center of a third opening 28. The selector blade is positioned immediately adjacent the inner surface of housing rear wall 17 and is pivotal about a rivet or the like 29 that is secured to wall 17 and extends through opening 28. The selector blade has a lateral extension 30 that projects through a slot (not shown) in cover plate 19 for manual actuation of the blade to place either of openings 26 or 27, as desired, in alignment with exposure opening 18. Housing rear wall 17 has a pair of spaced stop lugs 31 and 32 that limit pivotal movement of the selector blade about rivet 29. Thus, when the selector blade bears against stop lug 32, as shown in Figure 1, opening 26 is aligned with exposure opening 18. The selector blade may be rotated in a counter-clockwise direction about rivet 29 into abutting relation with stop lug 31 whereby opening 27 will be placed in alignment with exposure opening 18, as desired. The blade may be releasably retained in selected angular position by means of a suitable detent or the like (not shown).

Reference is next had to Figure 8 for an understanding of the details of construction of an aperture blade 33. This blade has an upper camming edge 34 and is provided with a forwardly projecting tab 35 and a rearwardly projecting tab 36. Formed in blade 33 is a pair of openings 37 and 38. Opening 37 is adapted to register with exposure opening 18 and the selected opening in the selector blade. The blade has a pair of forwardly extending studs 39 and 40. Freely rotatable about stud 40 is a pinion 41. A fly-wheel 42 of suitable mass is press-fitted or otherwise secured to pinion 41 for rotation therewith. The aperture blade is pivotal with respect to housing rear wall 17 by means of a stud 43 that extends through opening 38 (Fig. 1). Spaced lugs 44 and 45 integral with housing rear wall 17 limit clockwise and counter-clockwise pivotal movement, respectively of the aperture blade as viewed in Figures 1 and 2.

Carried by and positioned forwardly of the aperture blade is an exposure blade 46, best shown in Figure 7. This blade has an exposure window or opening 47 adapted to be placed in alignment or registration with corresponding openings in the housing and in the earlier described blades. The exposure blade also has a circular opening 48 for receiving stud 39, whereby to obtain a pivotal connection between the exposure blade and aperture blade 33 (Figure 1). Formed in the exposure blade is an arcuate rack made up of a series of teeth 49 adapted to mesh with successive teeth of pinion 41 upon rotation of the exposure blade about stud 39. The exposure blade has an integral forwardly extending tab 50 which limits clockwise movement of an exposure lever hereinafter to be described. Also integral with the exposure blade is a pair of forwardly projecting tabs 52 and 53, tab 52 limiting counter-clockwise movement of the exposure lever and tab 53 defining a notch with the body of the exposure blade.

A coil spring 54 is mounted on stud 43. One end of this spring bears against a lug 55 integral with housing rear wall 17 and the other end is coupled to a link 56 which is in turn connected to exposure blade tab 53. As will be apparent from an examination of Figure 1, spring 54 normally biases exposure blade 46 in a counter-clockwise direction with respect to aperture blade 33 about the axis of stud 39. Such movement of the exposure blade relative to the aperture blade is limited by engagement of exposure blade tab 52 with aperture blade tab 35. Spring 54 also normally urges the aperture blade in a clockwise direction about stud 43 as viewed in Figure 1 to the extent allowed by stop lug 44.

A flash switch member 60 is an element of a series electric circuit including a stud 61 carried by housing rear wall 17, a contactor post or rivet 62, a pair of electrically conductive strips 63 and 64, and a pair of rivets 65 and 66. The foregoing elements of the electric circuit are carried by the camera and are shown in Figures 1 and 2. The electric circuit additionally includes a photoflash lamp and an electric battery (not shown) for energizing the lamp. Switch member 60 is pivotal about stud 61 and, as best shown in Figure 5, is provided with a first finger 70 having a forwardly inclined upper portion 71; a second finger 72, inclined forwardly and carrying a rearwardly projecting tab 73; and a third finger 74 having a forwardly projecting tab 75. Finger 72 is spaced from the main body of the switch member and defines a slot 76 therewith. The switch member also includes an arm 77 intermediate fingers 72 and 74. This arm has a forwardly projecting tab 78.

The switch member is adapted to be releasably maintained in open position (Figures 1 and 2) by a latch member 80 that is pivotal about a stud 81 which is carried by and projects forwardly of housing rear wall 17. The latch member has an opening intermediate its ends, for the reception of stud 81. The latch member is provided with an upper tab 83 and a notched lower tab 84, both of which project forwardly.

A coil spring 85 is mounted on stud 61. One end of spring 85 bears against tab 78 of member 60. The other end of this spring bears against notched lower tab 84 of the latch member. As shown in Figure 1, switch member 60, latch member 80 and coil spring 85 are so configured and arranged that the spring normally and yieldingly urges the switch member in a clockwise direction about stud 61 and latch member 80 in a counter-clockwise direction about stud 81. Due to the hairpin shape of spring 85 and its engagement as shown, side thrust of the spring against stud 61 is minimized as well as friction between the stud, switch member 60 and the spring.

Exposure blade lever 90, as best shown in Figure 6, has a hub portion 91 in which opening 92 is provided for the reception of stud 39. Adjacent its opposite extremity, exposure blade lever 90 is notched as indicated at 93 so that when the free end portion 94 of the lever bears against the end of the rearwardly extending tab 73 provided on switch member 60, a portion of the forwardly inclined finger 72 overlays the end portion 94 and prevents the latter from escaping forwardly of the switch member.

An actuating rod 96 is pivotally connected at its lower end to stud 39. This rod is slidable through an opening 97 in the shutter housing. The upper end of rod 96 carries a cap, head or the like 98 (Figure 3).

For the purpose of outlining the mode of operation of the illustrated embodiment of the invention, it is assumed that the same has been assembled and the parts are in the relative position shown in Figure 1. This is the normal position of the parts before an exposure is initiated, aperture blade opening 37 and exposure blade opening 47 being disposed out of alignment with exposure opening 18, and switch member 60 being held in open position by latch member 80, against the action of coil spring 85.

To effect an exposure, the operator depresses rod 96 thereby swinging aperture blade 33 counter-clockwide about stud 43, as viewed in Figure 1, against the action of spring 54. Initial counter-clockwise rotation of aperture blade 33 effects movement of that blade and exposure blade 46 from the position thereof shown in Figure 1, the initial motion of aperture blade 33 being circumferential about stud 43 but that of the exposure blade 46 being primarily radially inward. The initial motion of exposure blade 46 is due to the fact that while it follows stud 39 connected to aperture blade 33 it is constrained against rotation under the influence of spring 54 due to the engagement of exposure blade lever 90 along one of its sides against tab 50 and on its opposite side against the end of tab 73 and behind a portion of finger 72 on switch member 60. During this initial portion of the movement of exposure blade 46, lever 90 rides along the end of tab 73 of the switch member. Thus, this portion of the movement of exposure blade 46 and lever 90 is along one side of a triangular path. Upon release of switch member 60, as will be described, lever 90 becomes free of the end of tab 73 and exposure blade 46 is free to rotate counter-clockwise under the influence of spring 54, along the second side of the aforementioned triangular path, in timed relation to the closing of the flash lamp circuit. As aperture blade 33 continues to rotate counter-clockwise tab 36 engages against the lower right edge of latch member 80 whereby said latch member is pivoted in a clockwise direction about stud 81 to release switch member 60 from the latch member, permitting the switch member to move clockwise under the influence of coil spring 85. The switch member 60 by its finger 70 engages rivet 62 thereby completing the circuit to the flash lamp.

The circuit is closed in advance of the shutter parts arriving at the position in which exposure opening 18, selected opening 26 of the selector blade, opening 37 of the aperture blade and opening 47 of the exposure blade are in alignment. By closing the switch member in advance of the shutter parts reaching their position of alignment, the film is exposed at the instant the light from the flash lamp reaches peak intensity. Also, pivotal movement of the exposure blade about stud 39 under the influence of coil spring 54 is dampened or retarded due to the inertia of pinion 41 and fly-wheel 42, thereby controlling the exposure time of the film.

With the parts in their exposure position, the aperture blade is at its limit of counter-clockwise rotation as it bears against stop lug 45. The exposure blade continues to move in a counter-clockwise direction about stud 39 under the action of spring 54, whereby its opening 47 is swung out of alignment with opening 37 of the aperture blade and exposure opening 18.

Upon release of actuating rod 96, coil spring 54 swings the aperture blade and the exposure blade in unison in a clockwise direction about stud 43 back to the position shown in Figure 1, thereby restoring the parts to their original relative position. In the course of such clockwise movement of the aperture blade, its camming edge 34 bears against tab 78 of the switch member and imparts counter-clockwise rotation of the switch member about stud 61.

At the same time, the end portion 94 of lever 90 comes into engagement with the inclined surface of finger 72 on the switch member and is cammed forwardly to clear tab 73. Lever 90 is sufficiently resilient to ensure its dropping back into its position between tab 73 on the switch member and tab 50 on the exposure blade. It is to be observed that during that portion of its travel where lever 90 is cammed out of its normal plane, the exposure blade 46 remains at all times in its own plane and is not inclined with respect to the other parts with which it coacts. It is only lever 90, having a relatively small mass as compared to the exposure blade which is bent out of its normal plane during the excursion of the various parts. Consequently, friction between the inclined surface of finger 72 and lever 90 may be minimized.

The edge of portion 94 which bears against tab 73 on switch member 60, preferably has a radius of curvature equal to the distance between the centers of openings 38 and 39 in aperture blade 33.

On completion of the return motion of the parts, exposure blade 46 and lever 90 have completed their travel along said triangular path and aperture blade tab 36 is disengaged from latch 80 permitting latch tab 83 to reengage switch member tab 75 and maintain the switch in its open position against the action of spring 85. The shutter and switch mechanism are now in condition for the start of a new cycle.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In a camera shutter and switch mechanism, a support, an aperture blade carried by and movable about a first axis with respect to said support, a switch member carried by and movable about a second axis with respect to said support from an open position to a closed position, said switch member in said closed position being adapted to complete a circuit including a flash lamp, a stud carried on said aperture blade spaced from said first axis, an exposure blade connected to said stud and movable in its plane with said aperture blade about said first axis, said exposure blade being movable in its plane about said stud relative to said aperture blade, an elongated lever connected to said stud and movable in a second plane parallel to said first mentioned plane about said first axis with said aperture blade and movable about said stud with said exposure blade, means on said exposure blade limiting relative movement of said lever and exposure blade in said planes while leaving said lever free to flex in a direction normal thereto, said lever having a free end portion extending radially from said stud and beyond said exposure blade toward said switch member, means normally retaining said switch member in its open position, means including resilient means for releasing said switch member and actuating said aperture and exposure blades whereby said switch member and aperture and exposure blades travel respective paths and return, means governing the motion of said exposure blade and lever relative to said first axis and stud whereby said exposure blade and lever travel a triangular path having a first side extending generally radially inwardly toward said first axis, a second side substantially an arc having a radius of curvature extending from said stud and a third side substantially an arc having a radius of curvature extending from said first axis, said last mentioned means including a finger carried by said switch member and having an inclined surface intersecting said second plane and normally intersecting the second and third sides of the path of said end portion of the lever, said end portion along the third side of its path engaging and sliding along said inclined surface and being deflected thereby in a direction normal to said second plane while said exposure blade continues moving in said second plane.

2. In a camera shutter and switch mechanism, a support, an aperture blade carried by and movable about a first axis with respect to said support, a switch member carried by and movable about a second axis with respect to said support from an open position to a closed position, said switch member in said closed position being adapted to complete a circuit including a flash lamp, a stud carried on said aperture blade spaced from said first axis, an exposure blade connected to said stud and movable in its plane with said aperture blade about said first axis, said exposure blade being movable in its plane about said stud relative to said aperture blade, an elongated lever connected to said stud and movable in a second plane parallel to said first mentioned plane about said first axis with said aperture blade and movable about said stud with said exposure blade, a pair of tabs on said exposure blade each adjacent to opposite sides of said lever whereby to limit relative movement of said lever and exposure blade in said planes while leaving said lever free to flex in a direction normal thereto, said lever having a free end portion extending radially from said stud and beyond said exposure blade toward said switch member, means normally retaining said switch member in its open position, means including resilient means for releasing said switch member and actuating said aperture and exposure blades whereby said switch member and aperture and exposure blades travel respective paths and return, means governing the motion of said exposure blade and lever relative to said first axis and stud whereby said exposure blade and lever travel a triangular path having a first side extending generally radially inwardly toward said first axis, a second side substantially an arc having a radius of curvature extending from said stud and a third side substantially an arc having a radius of curvature extending from said first axis, said last mentioned means including a finger carried by said switch member and having an inclined surface intersecting said second plane and normally intersecting the second and third sides of the path of said end portion of the lever, said end portion along the third side of its path engaging and sliding along said inclined surface and being deflected thereby in a direction normal to said second plane while said exposure blade continues moving in said second plane.

References Cited in the file of this patent

UNITED STATES PATENTS

| | | |
|---|---|---|
| 2,206,811 | Drotning et al. | July 2, 1940 |
| 2,286,808 | Hutchison | June 16, 1942 |
| 2,353,894 | Hineline | July 18, 1944 |
| 2,602,384 | Henne | July 8, 1952 |
| 2,690,105 | Lawson | Sept. 28, 1954 |